March 31, 1936. A. E. HAMILTON 2,035,958
APPARATUS FOR FEEDING MOLTEN GLASS
Filed Nov. 8, 1933 4 Sheets-Sheet 1

INVENTOR
Alfred E. Hamilton,
By Archworth Martin,
Attorney.

March 31, 1936. A. E. HAMILTON 2,035,958
APPARATUS FOR FEEDING MOLTEN GLASS
Filed Nov. 8, 1933 4 Sheets-Sheet 4
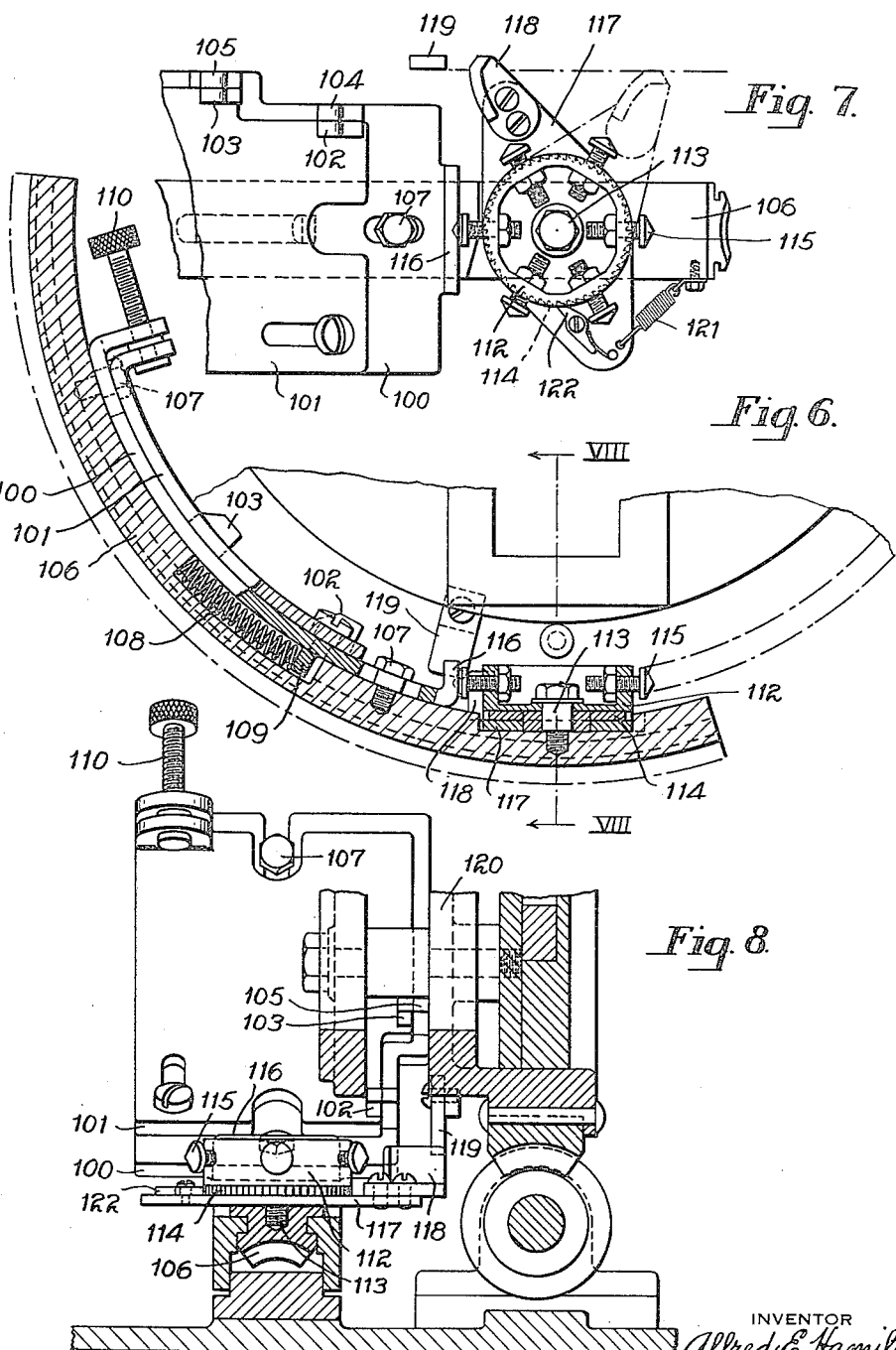

Patented Mar. 31, 1936

2,035,958

UNITED STATES PATENT OFFICE 2,035,958

APPARATUS FOR FEEDING MOLTEN GLASS

Alfred E. Hamilton, Pittsburgh, Pa.

Application November 8, 1933, Serial No. 697,165

8 Claims. (Cl. 49—55)

My invention relates to a method of and apparatus for feeding molten charges of glass to molds and constitutes an improvement upon the disclosure of my application No. 640,387, filed October 31, 1932.

In the feeding of glass charges to molds, and particularly in the feeding of charges for the machine production of small articles, many difficulties have been experienced in accurately controlling the sizes and shapes of the charges. Among the methods employed for feeding charges of glass have been that of fluid pressure control, involving pressures and vacuum within a bell, disposed above the flow ring commonly found at the bottom of a furnace boot.

In the forming of glassware it is common practice to supply the molds of a mold table from a single feeding orifice and feeder, by apparatus that is set to deliver charges of uniform size, it being necessary that all the molds on the table at a given time be of substantially the same size and the feeding apparatus adjusted accordingly. By this arrangement, it is possible to make but one size of ware on a blowing machine during a given time. Frequently, it is desired to fill orders involving different sizes of ware, in which case molds of a given size have to be placed on the mold table to fill one order, and different molds employed in place thereof to fill orders of another size of ware. It also happens that only a limited number of pieces of a certain size ware are required as compared to the quantities of ware of another size. By the previous systems, a full set of molds of each size has to be provided for the mold tables, in order that the feeder output can be economically accommodated.

My invention has for its object the provision of means whereby different sizes of mold charges can be supplied successively to the molds, so that a mold table can be economically utilized with a group of molds of different sizes.

Another object of my invention is to provide apparatus of generally simplified and improved form whereby the use of numerous control valves or other pressure control devices is rendered unnecessary to extremely accurate control of pressure and vacuum conditions within the bell.

Another object of my invention is to provide apparatus which may be readily adjusted to secure varying sizes and shapes of gobs or mold charges.

Still another object of my invention is to provide a simplified mechanism for effecting pulsations of air or other fluid within the bell.

Figure 1:
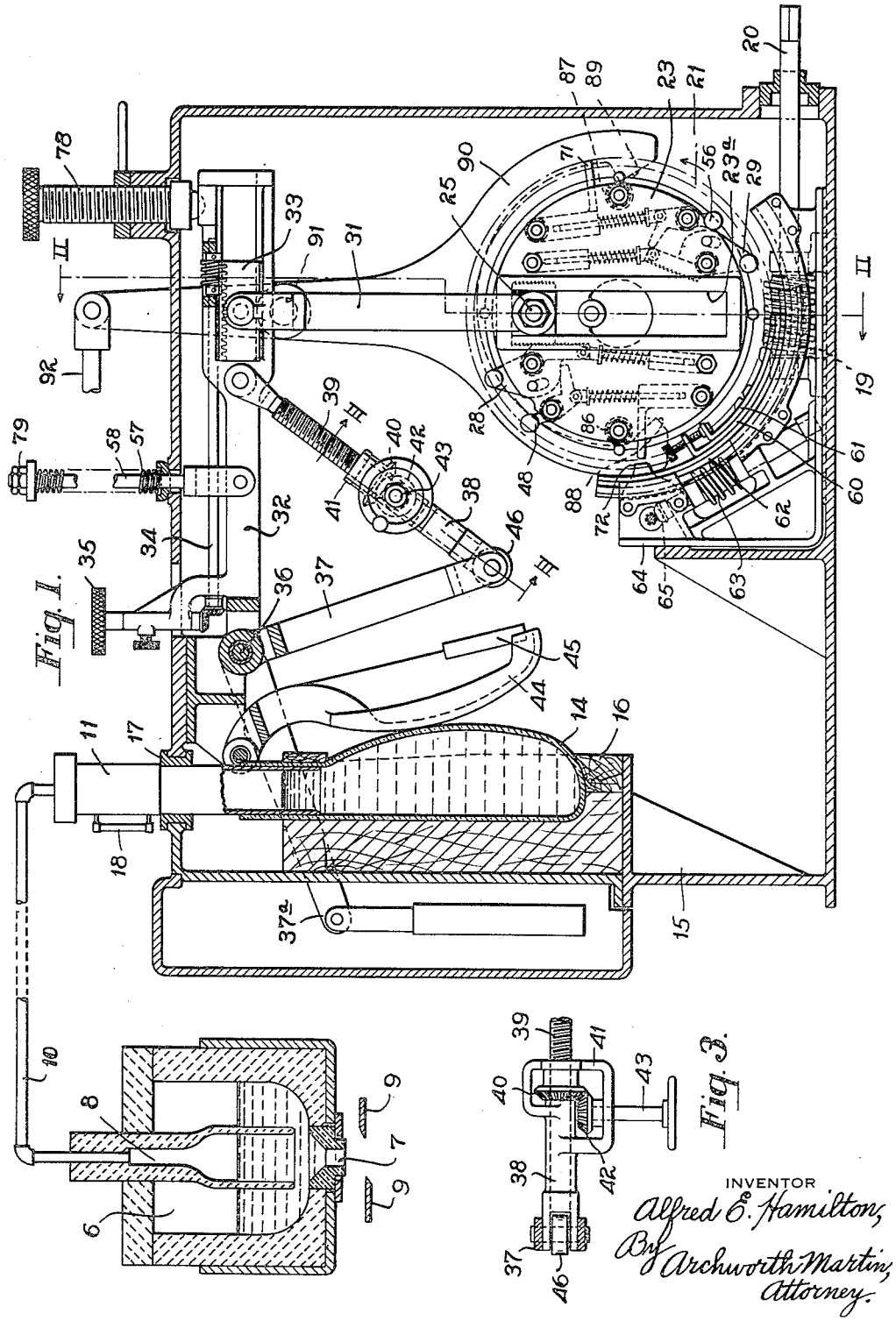
Figure 2:
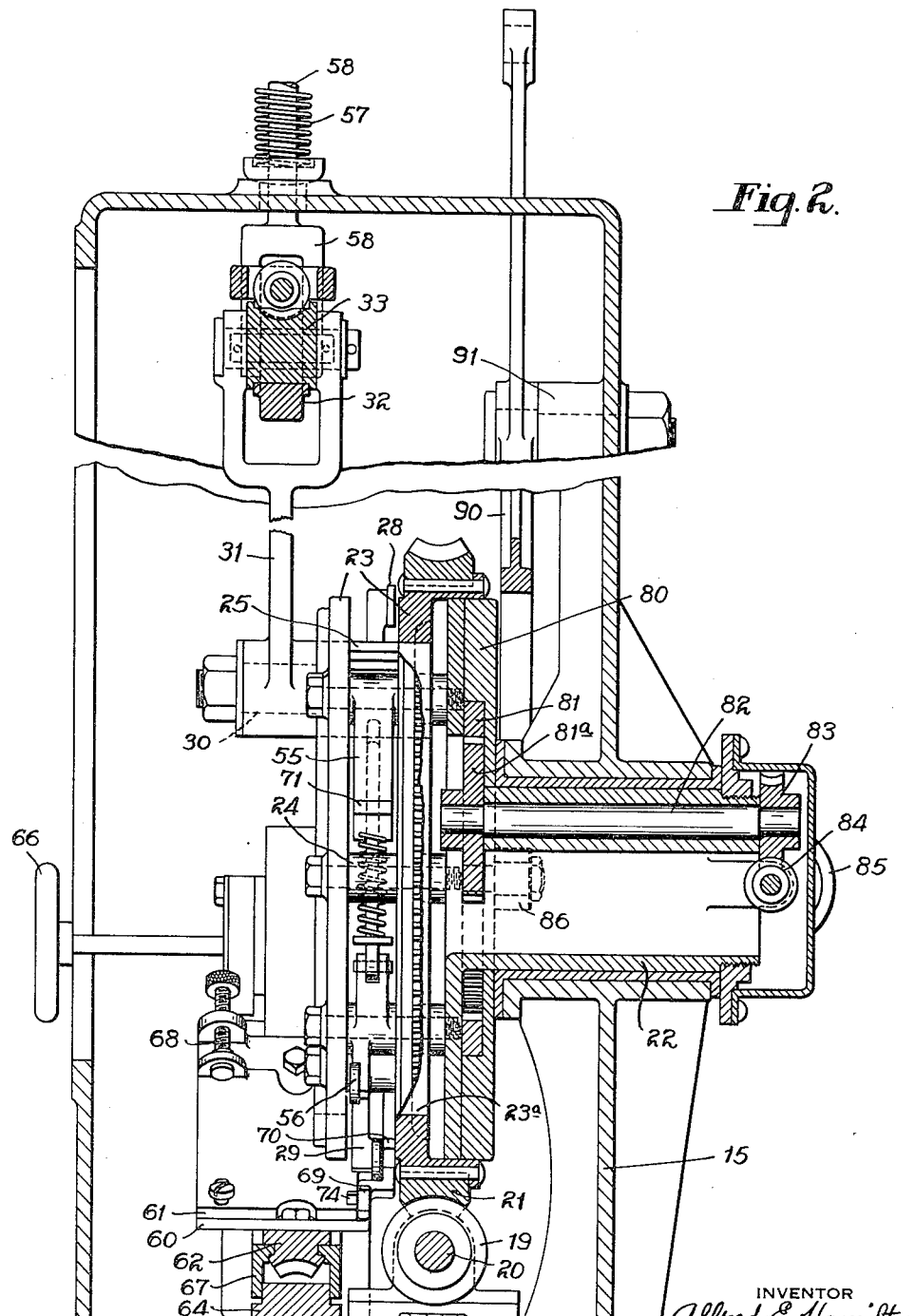
Figure 4:
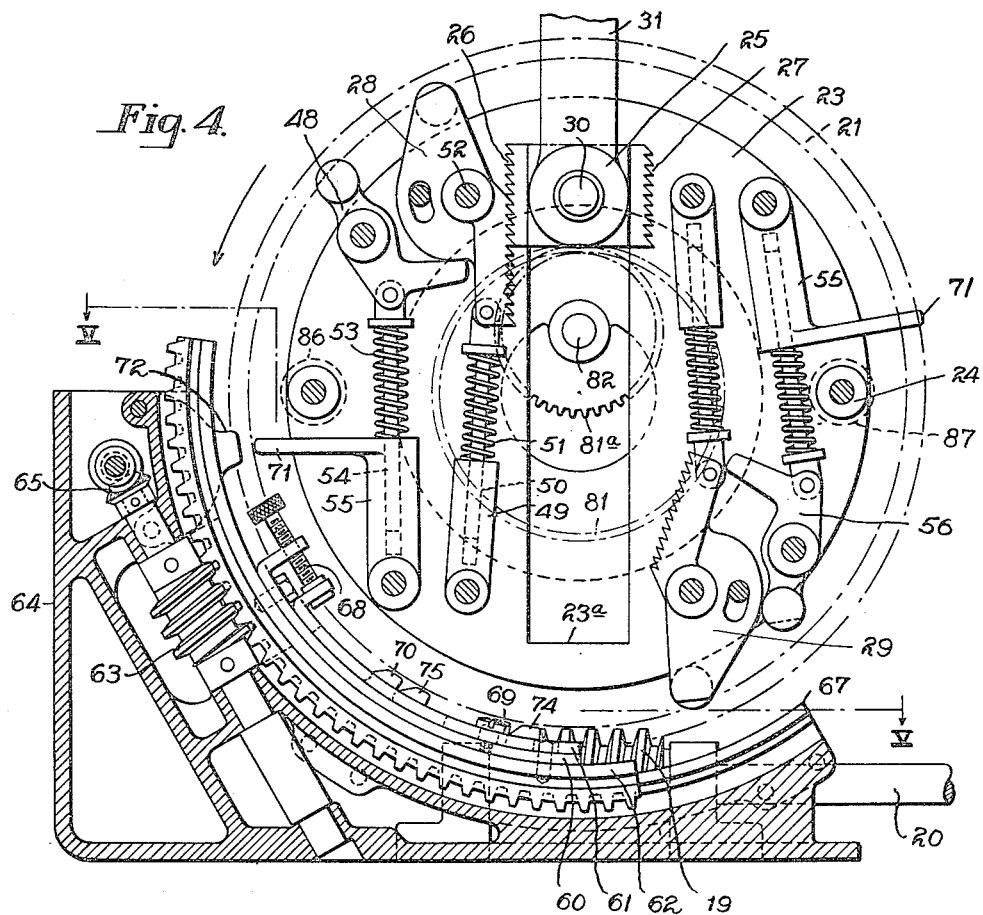
Figure 5:
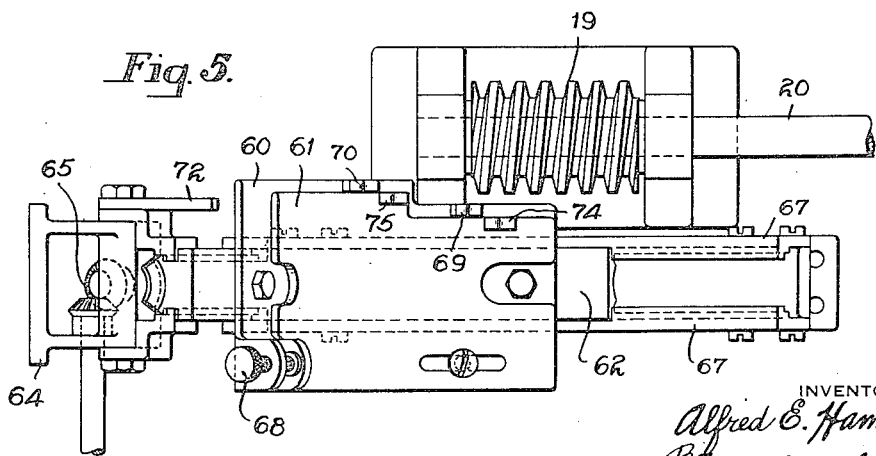

Apparatus whereby my invention may be practised is shown in the accompanying drawings, wherein Figure 1 is a longitudinal sectional view of the apparatus; Fig. 2 is a view taken on the line II—II of Fig. 1, on an enlarged scale; Fig. 3 is a view taken on the line III—III of Fig. 1; Fig. 4 is a sectional view, on an enlarged scale, of a portion of the apparatus; Fig. 5 is a view taken on the line V—V of Fig. 4; Fig. 6 is a sectional view showing a modification of the apparatus of Fig. 4; Fig. 7 is a plan view of the apparatus of Fig. 6, and Fig. 8 is a view taken on the line VIII—VIII of Fig. 6.

At 6, I indicate a furnace boot or forehearth which may be of any well-known type. The usual flow ring 7 and orifice is provided in the bottom of the boot, and a bell 8 is positioned above the flow ring, with its lower edge in spaced relation to the bottom of the boot. Shears 9 of any suitable type are positioned beneath the flow ring and may be operated as hereinafter described, to periodically sever charges of glass which will fall into molds. A fluid pressure line 10 has communication with the upper end of the bell, and with a chamber 11, pressure and suction conditions being periodically created within the bell 8 as hereinafter more fully described.

A bag or collapsible bulb 14 is disposed within a casing 15 and is tightly clamped by a clamping ring 16 to the lower end of the chamber 11, the chamber 11 being supported in a bushing 17. Mercury or other liquid is contained within the bulb 14 and is periodically forced up into the conduit 11 by the apparatus to be hereinafter described.

A gauge glass 18 is provided so that the operator may observe the pulsating actions of the liquid within the chamber 11. It will be understood that when the bulb 14 is compressed, the mercury will be forced up into the chamber 11 thus compressing the air that is contained within the pipe 10 and the bell 8 and thereby exerting an extrusive pressure on that portion of the glass which is immediately above the orifice 7. When the bulb 14 is released, the mercury will flow downwardly to relieve the pressure within the bell 8 and to perhaps actually create a partial vacuum within the bell, depending upon the extent of movement given to the mercury. The pressure conditions within the bell will, of course, be varied in accordance with various factors, such as the fluidity of the glass, the size and shape of gobs or charges to be produced, etc.

The bulb 14 may suitably be of rubber, rubberized fabric, or any other flexible material which has sufficient strength and wearing quality to support the weight of the mercury and to withstand flexing. The volume of mercury employed will be dependent upon the size and length of the passageways leading to the bell, the size of the bulb, the sizes of glass charges to be produced, etc. For ordinary use, I have found that 100 lbs. of mercury will produce satisfactory results.

A worm 19 is disposed within the casing 15 and its shaft 20 is driven from any suitable source of power. The worm meshes with a worm wheel 21 which is provided with a hub 22 (Fig. 2) that is journalled in a bearing at the side of the casing. A pair of crank discs 23 are secured to the gear wheel 21, spacing blocks 24 being interposed between the plates 23.

The plates 23 are slotted at 23a to receive the ends of a cross head 25 that is slidably supported therein. The edges 26 and 27 of the cross head are toothed for engagement with pawls 28 and 29, respectively.

The pawls 28 and 29 are pivotally supported between the plates 23, near the ends of the slot 23a, and are disposed at opposite sides of the slot for alternate engagement with the toothed sides 26 and 27, respectively, of the crosshead. The cross head 25 carries a crank pin 30 to which a crank arm 31 is connected at its lower end, the upper end of the crank arm being pivotally supported by a lever 32 through pivotal connection with a block 33 which is slidably carried by the lever. The slide block 33 has worm gear connection with an adjusting rod 34 that is rotatably supported in the lever 32. The arm 32 also carries an adjusting wheel 35 that can be turned to effect rotative adjustment of the rod 34 and hence of the pivot block 33, to thereby adjust the "throw" of the lever 32, by the crank arm 31.

The lever 32 is pivotally supported at 36 by a bracket which is secured to the walls of the casing, and a presser member 37 is also pivotally connected to the pin 36, at its upper end, and at its lower end is pivotally connected to a link section 38. A link section or rod 39 has telescopic connection with the section 38, and carries a bevel gear 40, the rod having threaded connection with the hub of the gear. The upper end of the section 39 is pivotally connected to the lever 32. The link section 38 is provided with a web 41 for confining the gear 40 against axial movement, so that the overall length of the sections 38—39 may be adjusted, as desired, by rotation of the gear 40.

A weighted extension 37a of the lever 32 holds the presser member 37 in retracted position. A bevel gear 42 is journalled on the lower section 38, and meshes with the gear 40. The gear wheel 42 is operated by means of a shaft 43, which may carry a suitable hand wheel.

A shoe 44 is pivotally supported at its upper end and is interposed between the presser 37 and the bag 14, the shoe preferably being of convex form at its forward side to more effectively compress the bag, and cause mercury to flow up into the chamber 11, as heretofore explained. The curvature or convexity of the shoe 44, both longitudinally and transversely thereof is approximately the same as the curvatures of the bag 14, so that there is a minimum of friction between them. A striking plate 45 is secured to the shoe and is engaged by a roller 46 at the lower end of the arm 37, to reduce friction between the presser and the shoe.

Ordinarily, the shaft 20 will be constantly driven, to rotate the worm gear 21 and the cam disc 23 in the direction of the arrow in Fig. 4, such movement resulting in the cross-head 25 being carried downwardly from the position shown in full lines in Fig. 1. During this travel, the cross-head is locked to the crank plates by the pawl 28. The cooperating teeth of these members are inclined in such direction that during the first part of this travel, the cross-head is held against radially outward movement with respect to the plates 23.

A resetting dog 48 is pivotally supported between the discs 23, for throwing the pawl 28 back into cooperative relation with the teeth 26 of the cross-head, after the pawl has been tripped, as hereinafter explained. The pawl 28 is yieldably held in its operative and inoperative positions by an over-center device consisting of a socket 49 which is pivotally mounted on the discs, a telescopic rod 50 which is pivotally connected to the pawl and has slidable engagement with the socket, and a spring 51. The pivotal connection between the rod 51 and the pawl 28 is offset to one side of the pivotal mounting 52 of the pawl when the teeth are in engagement, as shown in Fig. 4, and is offset in the opposite direction with respect thereto when the pawl is in its tripped position. The dog 48 is similarly yieldably held in over-center position by a spring 53, a telescopic rod 54 and a socket 55. The pawl 29 has a resetting dog 56, these members being mounted and operated in the same manner as are the pawl 28 and its resetting dog 48.

It will be seen that as the crank discs or plates 23 are rotated in the direction of the arrow of Fig. 4, they will carry with them the cross head 25, thereby pulling down the crank arm 31, and swinging the presser 37 against the shoe 44 to compress the bag 14. Stop members are provided for tripping the pawls and releasing the cross-head, to permit outward movement of the crank arm 31, under the influence of a spring 57, which cooperates with a pull rod 58 that is pivotally connected to the lever 32, to yieldably force the lever 32 upwardly. This movement, of course, results in withdrawal of the presser 37 and permits the bag 14 to expand and create suction within the bell.

A pair of stop plates 60 and 61 are adjustably positioned on a segmental gear 62, which meshes with a worm gear 63 that is journaled in a bracket 64. The worm 63 is operated by bevel gears 65 and a hand wheel 66 which has connection with one of the gear wheels 65. The segmental gear 62 is supported by side plates 67 that are suitably secured to the bracket 64, a tongue and groove connection being provided between the gear and each side plate. The segmental gear and the stop plates carried thereby can therefore be adjusted in directions circumferentially of the discs 23. The stop plate 60 is secured to the segmental gear 62 by means of suitable screws, as shown, and carries an adjusting screw 68 whose lower end is journalled in a wing-like extension of the stop plate 61. Upon turning of the screw 68, the stop plates can be adjusted relative to one another.

The plate 60 is provided with stops 69 and 70 that are positioned to be engaged by the outer ends of the dog 48 and the pawl 28, respectively, the stop 69 being so positioned that it will be engaged by the resetting dog 48 slightly in advance of engagement by the pawl 28 with the stop 70, so that the dog 48 will be swung to released position and permit the pawl 28 to be swung out of engagement with the teeth 26.

It will be understood that the adjustment of the segmental gear 62 is such that the stop 70 will trip the pawl 28 at a desired point in its path of travel, so that the cross-head 25 can be released at a desired point in its downward travel, to interrupt compression of the bag 14, and to release the bag, in accordance with the extent or degree of impulses desired within the bell 8. The size and shape of the mold charges are, of course, determined by the movements of the bag.

When the cross-head is tripped as above-explained, it will move to the opposite end of the slots 23a, where its teeth can be engaged by the other pawl 29, which will be in turn tripped as hereinafter explained. The pawls 28 and 29 are reset by the arms 71 of the sockets 55 coming into engagement with a stop 72, which is secured to the bracket 64. These stops are so positioned that the resetting dogs 48 and 56 will be thrown inwardly and move the pawls to operative position substantially just as the cross-head reaches its uppermost position.

When the pawl 29 has engagement with the cross-head and is causing a succeeding compression of the bag 14, the outer ends of the dog and pawl will successively engage stops 74 and 75, respectively, the stop 74 tripping the dog to permit the pawl to be swung to released position by the stop 75. The stops 74 and 75 are carried by the plate 61 and are offset in directions axially of the cam plates 23 so that they will be out of the path of the dog 48 and the pawl 28. The stops 69 and 70 are similarly offset so that they will not be engaged by the dog 56 and the pawl 29.

If the plate 61 is so adjusted that the stops 70 and 75 are in axial alinement with one another, the pawls 28 and 29 will be successively tripped at corresponding points in their paths of travel, so that the impulses produced in the bell will be all the same, and consequently glass charges all of the same size will be fed. As above-indicated, the plates 60 and 61 can be adjusted as a unit, so that if the stops 70 and 75 are positioned to produce 8 oz. charges, for example, they can be shifted to produce charges of other weights. In other words, with the stops 70 and 75 in axial alinement, the feeder can be operated to supply a mold table whereon all of the molds are a given size. If now a mold table contains molds of different sizes, the stops 70 and 75 will be offset circumferentially relative to one another, by means of the adjusting screw 68, as above-explained. For instance, the table might contain 6 oz. molds alternating with 8 oz. molds, the degree of the relative adjustment of the stops 70 and 75 being, of course, dependent upon the difference in mold sizes.

Should the stops 70 and 75 be set for 6 and 8 oz. molds, and it is desired to change to 7 and 9 oz. molds, such change can be effected merely by adjusting the segmental gear 62. It will be understood, of course, that a very wide range of adjustments can be effected by this arrangement.

Under some conditions it may not be desired to create a substantial degree of suction within the bell, in which case the bag 14 will not be permitted to fully expand under the weight of the mercury. The extent to which the shoe 44 is permitted to move away from the bag is controlled by the adjustment of the links 38 and 39, by the gear 40, as well as by a stop screw 78 that is threaded into the upper wall of the casing, and limits upward movement of the lever 32. The adjustment at 40 can be varied to control the extent to which the bag is compressed, for a given length of stroke of the crank arm 31. Thus if the members 38—39 are fully extended, the bag will be fully compressed upon each operation of the presser, while the length of the members can be shortened to compress the bag to a lesser extent with the corresponding stroke of the crank arm 31.

From the foregoing, it will be understood that when the bag is compressed, a feeding impulse will be imparted to the glass, and this feeding impulse will be made more pronounced in the case of rather viscous glass, and in cases where large gobs are being formed. For more fluid glass, and smaller charges, little or no expulsive force will be required to secure desired flow through the orifice 7. When a desired quantity of glass has issued through the orifice, suction will be created by release of the bag and gravity return of the mercury. The change from either atmospheric or super-atmospheric pressure to suction may be effected so quickly as to cause abrupt necking at the gob-shearing point, or a change from pressure to suction may be made slowly in order to form an attenuated gob for certain classes of work.

The duration of the application of extrusive force can be controlled by adjusting the stops 69—70 and 74—75 as heretofore indicated, so that the cross head 25 will be tripped earlier or later, as desired. Furthermore, the rate of return or outward movement of the cross-head, and hence the rate of withdrawal of the compressor 37 can be regulated by adjusting the nuts 79 so that the rate of expansion of the spring 57 can be varied.

In order that the shears 9 may be operated in synchronism and properly timed relation with respect to the feeding impulses, I provide a ring plate 80 whose edge is seated against the inner peripheral wall of the worm gear 21 (Fig. 2). The inner face of the ring 80 is recessed and a ring gear 81 is mounted therein and secured to the ring plate 80. A pinion 81a that is carried on the inner end of a shaft 82 meshes with the gear 81. The shaft 82 is supported in the hub 22. The outer end of the shaft 82 carries a worm gear 83 that meshes with a worm 84. The worm 84 is operated by a hand wheel 85 to thereby effect rotative adjustments of the ring plate 80. The ring plate carries rollers 86 and 87 (Fig. 1), which function as stops that cooperate with the teeth 88 and 89 of a yoke 90. The ring plate 80 is loosely supported on the hub 22, but is adjustably locked thereto by pinion 81a and the worm drive 83—84, and rotates as a unit with the worm gear 21, so that the rollers 86 and 87 are periodically brought into engagement with the teeth 88 and 89 to effect oscillation of the yoke 90.

The yoke 90 is pivotally mounted on the casing at 91, and its upper end has connection with a pull rod 92 which, through suitable connections, will operate the shears 9 in timed relation to rotative movement of the worm gear 21.

It is desirable, of course, that the shears 9 open quite quickly after they have been closed to sever a glass charge, to avoid piling of glass on top of the shear blades. Assuming that the ring plate 80 is turning in such direction that the roller 87 has made engagement with the tooth 89, to swing the yoke 90 in such manner as to close the shears, such closing action is immediately followed by engagement of the roller 86 with the tooth 88 to swing the yoke in the opposite direction and thereby instantly open the shear blades 9.

The rotative adjustment of the ring plate 80 permits change in timing as between the operation of the shears and the operation of the feeding mechanism, so that shearing may be effected early or later with respect to the extrusion of the glass in the flow ring, as may be desired.

It will be understood that flow of liquid from types of containers other than glass furnace boots may be controlled by my apparatus, and that the use of a bell may not be necessary if the air space in the boot does not have communication with the air space in the furnace proper. Also, my invention may be employed with feeders of the plunger type and the lever extension 37a employed to actuate a plunger for controlling flow at an orifice.

Referring to Figs. 6, 7, and 8, I show a different arrangement of apparatus for adjusting the tripping mechanism. In this structure the stop plates 100 and 101 correspond to the stop plates 60 and 61. The stop plate 101 has stops 102—103 which correspond to the stops 74—75 of the stop plate 61, while stops 104—105 of the plate 100 correspond to the stops 69—70 of the plate 60.

The plates 100 and 101 are carried by a gear segment 106 which corresponds to the gear segment 62, and may be mounted and adjusted by a worm in the same manner. The plate 100 is not, however, rigidly bolted to the gear segment, but is slidably supported thereon by means of screws 107. A spring 108 set into a pocket in the segmental gear engages a depending block 109 of the plate 100, to yieldably hold the plates in one extreme position as shown in Fig. 6. The plates 100 and 101 are adjustable relative to one another by means of an adjusting screw 110.

An indexing device 112 is rotatably mounted on a stud bolt 113 which is threaded into the gear segment 106, and is provided with ratchet teeth 114 in its periphery and carries adjustable studs 115 that are successively brought into engagement with an upturned lip 116, on the lower end of the plate 100, so that as the studs 115 are successively brought into engagement with the lip 116, they will, of course, push the plates 100 upwardly against the depression of the spring 108. The degree to which the plate may be forced upwardly is dependent, of course, upon the setting of the various studs 115. This shifting of the plate 100, of course, shifts the stops 102 to 105, to produce different sizes of mold charges.

The member 112 is actuated by a rocking lever 117 that is pivotally supported on the stud bolt 113. The end 118 of the lever is successively engaged by lugs 119 which are provided on the rear crank plate 120 that corresponds to the rear crank plate 23. The striking surface 118 of the lever is held in the path of the lugs 119 by a spring 121. A pawl 122 is mounted on the lever 117 and engages the teeth 114 so that as each lug 119 swings the lever 117, the ratchet will be turned to bring another stud 115 into engagement with the lip 116.

A wider range in sizes of charge can, of course, be secured with this arrangement than with the structure of Figs. 1 to 4, because a different size charge can be obtained by the use of each of these studs 115. In the present instance, I have shown 6 stops whereby 6 different sizes of charge can be secured. Other ranges of 6 different sized charges can be secured by adjustment of the segmental gear 106.

I claim as my invention:—

1. The combination with a receptacle having a discharge orifice adjacent to its lower side, of a compressible reservoir, a conduit connecting the receptacle with the reservoir, a pressure member cooperating with said reservoir, a driving member, a releasable operating connection between the driving member and the presser member, and a plurality of independently-operable controlling members for successively breaking the connection, to limit compressing movements of the presser member.

2. The combination with a receptacle having a discharge orifice adjacent to its lower side, of a compressible reservoir, a conduit connecting the receptacle with the reservoir, a presser member cooperating with said reservoir, a driving member, a releasable operating connection between the driving member and the presser member, and a plurality of independently operable controlling members for successively breaking the connection to limit compressing movements of the presser member, the said members being adjustable to variably control compressing movement of the presser member.

3. The combination with a receptacle having a discharge orifice adjacent to its lower side, of a compressible reservoir, a conduit connecting the receptacle with the reservoir, a presser member cooperating with said reservoir, a driving member, a releasable operating connection between the driving member and the presser member, and a plurality of independently operable controlling members for successively breaking the connection to limit compressing movements of the presser member, the said members being adjustable both relatively and as a unit, to variably control movements of the presser member.

4. Glass-feeding apparatus comprising a receptacle for molten glass, having an orifice adjacent to its lower side and an air-confining enclosure above the glass level in the vicinity of the orifice, a conduit communicating with said enclosure, means for confining a body of air in said conduit and the enclosure, a pulsating device acting on said confining means to constrict the same and thereby produce pneumatic impulses on the surface of the glass, in periodically recurring feeding cycles, and means effective during operation of said device to vary the effect thereof on said confining means in each of successive cycles.

5. Glass-feeding apparatus comprising a receptacle for molten glass, having an orifice adjacent to its lower side and an air-confining enclosure above the glass level in the vicinity of the orifice, a conduit communicating with said enclosure, means for confining a body of air in said conduit and the enclosure, a pulsating device acting on said confining means to constrict the same and thereby produce pneumatic impulses on the surface of the glass, in periodically recurring feeding cycles, and a plurality of independently-operable controlling members for said device respectively operative during successive cycles to effect discharges of glass through said orifice, the said members being relatively adjustable to secure variation in operation of said pulsating device.

6. Glass-feeding apparatus comprising a receptacle for molten glass, having an orifice adjacent to its lower side and an air-confining enclosure above the glass level in the vicinity of the orifice, a conduit communicating with said enclosure, means for confining a body of air in said conduit and the enclosure, a pulsating device acting on said confining means to constrict the same and thereby produce pneumatic impulses on the surface of the glass, in periodically recurring feeding cycles, a plurality of independently-operable controlling members for said device respectively operative during successive cycles, to effect discharges of glass through said orifice, and means for adjusting said members as a unit.

7. The combination with a receptacle having a discharge orifice adjacent to its lower side, of a compressible reservoir, a conduit connecting the receptacle with the reservoir, a presser member cooperating with said reservoir, a rotatable driving member for said presser member, a releasable operating connection between the driving member and the presser member, a plurality of tripping devices arranged to successively break the said operating connection, and means for restoring the driving connection after each tripping operation.

8. The combination with a receptacle having a discharge orifice adjacent to its lower side, of a compressible reservoir, a conduit connecting the receptacle with the reservoir, a presser member cooperating with said reservoir, a rotatable driving member for said presser member, a releasable operating connection between the driving member and the presser member, a plurality of tripping devices arranged to successively break the said operating connection, and means for restoring the driving connection after each tripping operation, the said tripping devices being adjustable along the circumferential path of the rotatable driving member.

ALFRED E. HAMILTON.